R. E. NORTHWAY.
TRANSMISSION MECHANISM.
APPLICATION FILED JAN. 27, 1906.
908,419.
Patented Dec. 29, 1908.
3 SHEETS—SHEET 1.
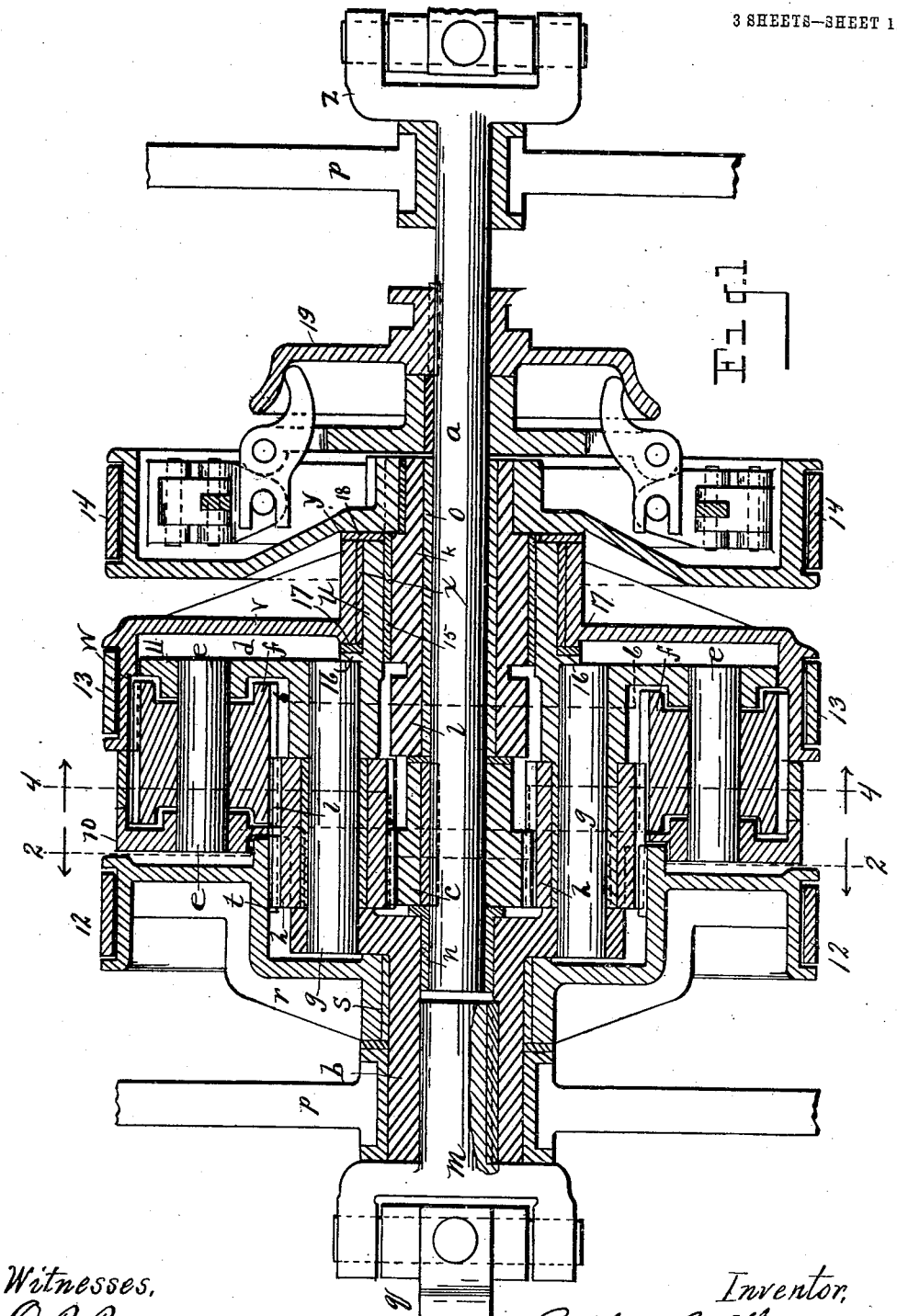
Witnesses.
O. B. Baenziger
A. M. Murphy
Inventor,
Ralph E. Northway
By Newell S. Wright
Attorney

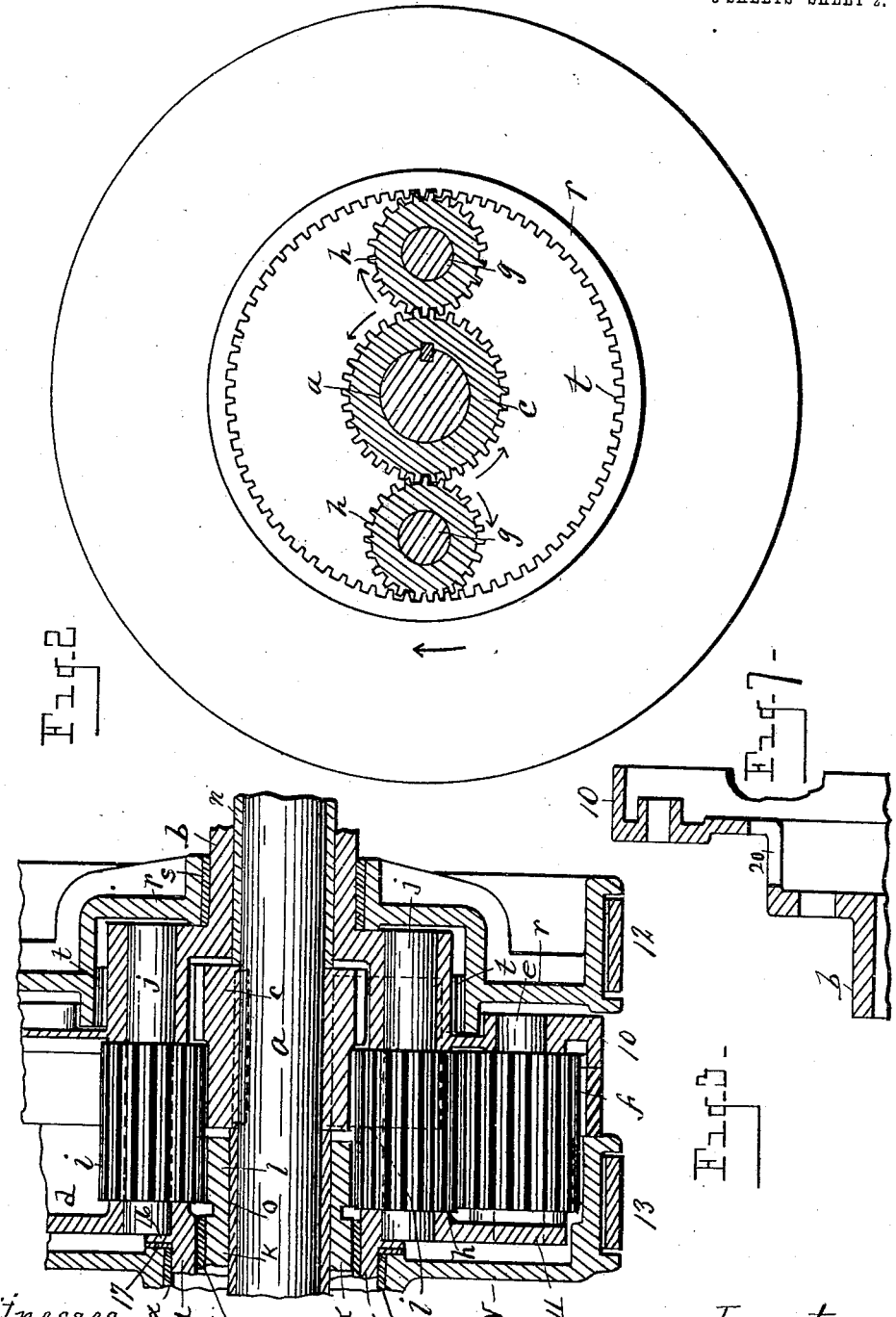

R. E. NORTHWAY.
TRANSMISSION MECHANISM.
APPLICATION FILED JAN. 27, 1906.

908,419.

Patented Dec. 29, 1908.

3 SHEETS—SHEET 3.

Witnesses.
O. B. Baenziger
A. M. Murphy.

Inventor.
Ralph E. Northway
By Newell S. Wright
Attorney

UNITED STATES PATENT OFFICE.

RALPH E. NORTHWAY, OF DETROIT, MICHIGAN, ASSIGNOR TO NORTHWAY MOTOR AND MANUFACTURING COMPANY, OF DETROIT, MICHIGAN, A CORPORATION OF MICHIGAN.

TRANSMISSION MECHANISM.

No. 908,419.  Specification of Letters Patent.  Patented Dec. 29, 1908.

Application filed January 27, 1906. Serial No. 298,251.

*To all whom it may concern:*

Be it known that I, RALPH E. NORTHWAY, a citizen of the United States, residing at Detroit, county of Wayne, State of Michigan, have invented a certain new and useful Improvement in a Transmission Mechanism, of which the following is a specification, reference being had to the accompanying drawings, which form a part of this specification.

My invention is designed to provide certain new and useful improvements in a transmission mechanism for automobiles and other structures, the same having for its object more particularly a transmission mechanism of the planetary type capable of securing multiple speeds ahead together with a reverse motion.

The aim of my invention is to provide a compact transmission mechanism of this description, of superior efficiency and utility.

My invention consists of the construction, combination and arrangement of devices and appliances hereinafter described and claimed and illustrated in the accompanying drawings in which—

Figure 4:
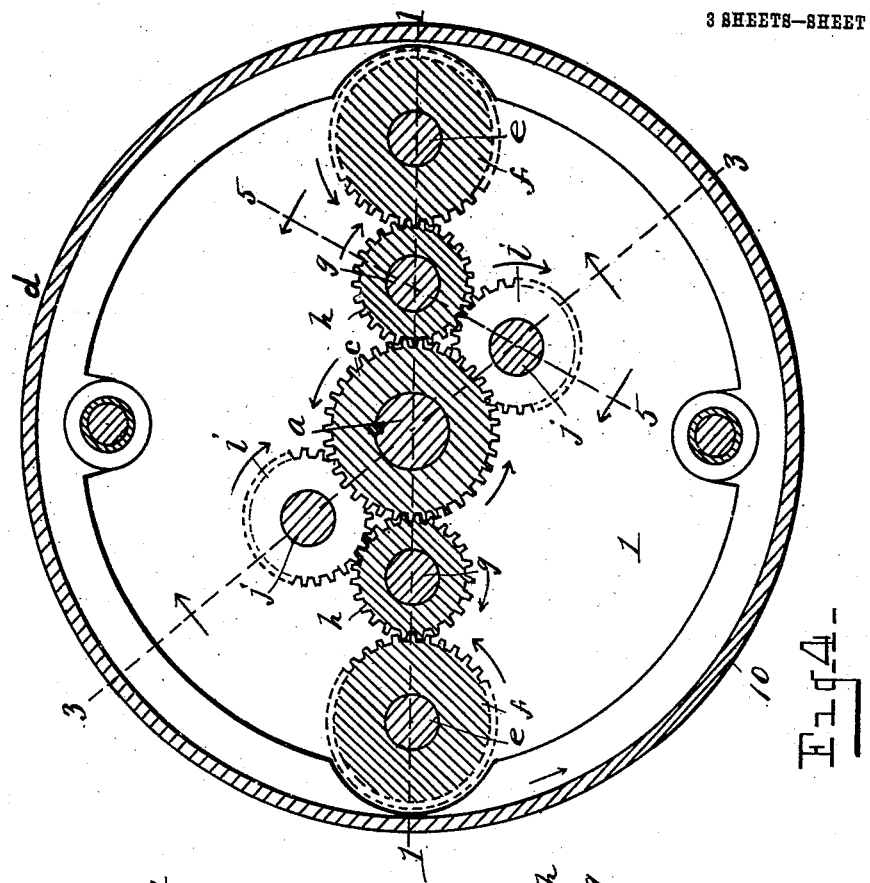
Figure 5:
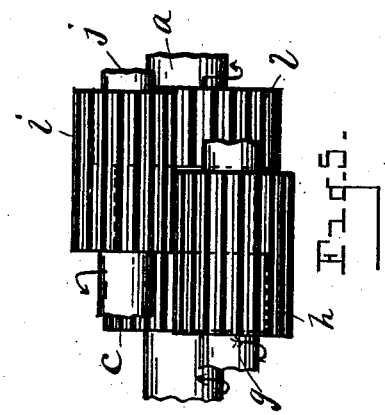
Figure 6:
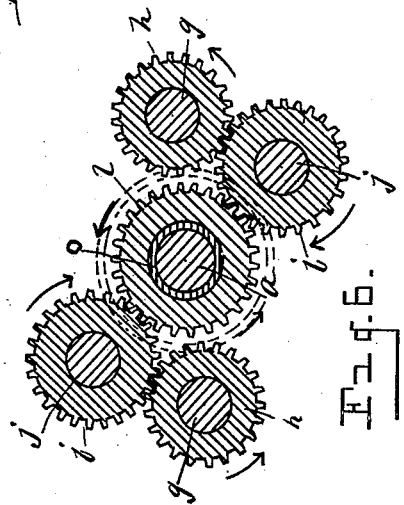

Figure 1 is a view in section longitudinally of the shaft, on the line 1—1, Fig. 4. Fig. 2 is a view in transverse section on the line 2—2, Fig. 1. Fig. 3 is a view in section on the line 3—3, Fig. 4. Fig. 4 is a view in transverse section on the line 4—4, Fig. 1. Fig. 5 is a view in section on the line 5—5, Fig. 4. Fig. 6 is a view in transverse section on the line 6—6 Fig. 1. Fig. 7 is a detail view showing a portion of the driving drum.

I carry out my invention as follows:—

In the drawings $a$ represents a driving shaft driven continuously in one direction having a bearing at its inner end in a transmission member $d$ provided with an outwardly extending hub $b$. Upon said shaft is a driving pinion $c$ and also a sleeve $k$ provided with an intermediate pinion $l$ at the inner end thereof. The transmission member $d$ is constructed, for convenience of assembling, in two parts, viz. a plate 10, provided with the hub $b$, and a plate 11, one of said plates, as the plate 10, being separable from the other, and the plate 11 being provided with a hub $u$ loosely mounted upon the sleeve $k$. Said plates carry plural studs $e$ upon which are mounted reversing gears $f$, also studs $g$ carrying elongated pinions $h$, in mesh with the pinion $c$, and studs $j$ carrying additional elongated pinions $i$ in mesh with the intermediate pinion $l$. The hub $b$ of the transmission member is shown keyed upon a driven member $m$. A bushing $n$ intervenes, preferably, between the hub and the shaft $a$. The hub $b$ has a bearing in a bearing frame $p$, said frame also forming a bearing for the outer end of the shaft $a$. The driven member $m$ is shown provided with a universal coupling $q$, and the shaft $a$ with a universal coupling or joint $z$. It will be understood that any suitable mechanism may be employed as a driven member.

Loosely mounted upon the hub $b$ is a slow speed drum $r$ provided, preferably, with an intervening bushing $s$, and with an internal gear $t$ meshing with the gears $h$. Upon the hub $u$ of the transmission member is loosely mounted a reversing drum $v$, having an internal gear $w$ meshing with the gears $f$. A bushing $x$ intervenes between the hub $u$ and the reversing drum $v$. A bushing $o$ intervenes between the shaft $a$ and the sleeve $k$, and a bushing 15 between the sleeve $k$ and the hub $u$. The transmission member is preferably constructed with an annular shoulder 16, a washer 17 being located between said shoulder and said member. An intermediate gear drum $y$ is keyed upon the outer end of the sleeve $k$. A washer 18 is shown between the hub $u$ and the drum $y$. Suitable clutch mechanism, preferably such as is embodied in an application executed by me November 24, 1905, Serial No. 292,763, engages and actuates said intermediate gear drum, the clutch mechanism comprising a driving member 19 keyed upon the shaft $a$.

It will be observed that all of the gear carrying studs are carried within the transmission member by the plates 10 and 11, so that the transmission member carries all the trains of gears employed. The plate 10 of the transmission member is cut through or slotted as shown at 20, so that the gears $h$ may mesh with the internal gear $t$. A brake band 12 is shown to engage the slow speed drum $r$, a brake band 13 to engage the reversing drum $v$, and a brake band 14 to engage the intermediate gear drum $y$. The operation of the mechanism will now be understood.

As above described the driving pinion $c$ meshes into the elongated gears $h$, the gears $h$ meshing with the internal gear $t$ of the slow speed drum $r$, and also with the reverse pinions f, and also into the gears i, while the gears i mesh further with the intermediate pinion l upon the sleeve k. Obviously the diameters of the gears within the transmission member may be so constructed that none of the gears will run faster than the driving pinion c, in any of the operations of the mechanism. While I do not limit myself to such a construction, this construction would tend to make a smooth working and practically noiseless transmission gear.

To secure a slow speed ahead the brake 12 is applied to hold the drum r, the other brakes and the clutch mechanism being loose.

To secure an intermediate speed ahead the brake 14 is applied to hold the intermediate gear drum, the other brakes and the clutch mechanism being free.

To secure a high speed ahead the brakes are all unemployed, the clutch mechanism being in engagement with the drum y.

To secure a reverse motion the brake 13 is applied, all the other brakes and the clutch mechanism being loose.

It will be apparent that when the clutch mechanism is engaged with the drum y, all the brakes being free, the drive is direct, the driving drum d being locked with the shaft.

The drum d is free when using the reverse, the low speed, or the intermediate speed mechanism.

What I claim as my invention is:—

1. In a transmission mechanism the combination of a driving shaft, a driving pinion thereupon, a driven member, a sleeve upon the driving shaft provided with an intermediate pinion, a transmission member constructed of separable plates, one of said plates provided with a hub loosely mounted upon said sleeve, and the other of said plates provided with a hub forming a bearing for the inner end of the driving shaft, and rigidly connected upon the driven member, studs having their opposite extremities carried by said plates, gears upon said studs, a slow speed drum provided with an internal gear mounted upon the hub of the plate of the transmission member engaged upon the driven member, a reversing drum loosely mounted upon the hub of the plate of the transmission member upon said sleeve and provided with an internal gear, an intermediate gear drum keyed upon said sleeve, means to actuate the intermediate gear drum, and controlling mechanism coöperating with said gears and transmission member to secure plural speeds ahead and a reverse motion of the driven member.

2. A transmission mechanism having in combination a driving shaft, a driving pinion upon said shaft, a driven member, a sleeve upon the driving shaft provided with an intermediate pinion, a transmission member constructed of separable plates, one of said plates provided with a hub loosely mounted upon said sleeve, and the other of said plates provided with a hub forming a bearing for the inner end of the driving shaft, and rigidly connected upon the driven member, studs having their opposite extremities carried by said plates, a slow speed drum provided with an internal gear mounted upon the hub of the plate of the transmission member engaged upon the driven member, a reversing drum provided with an internal gear loosely mounted upon the hub of the plate of the transmission member upon said sleeve, an intermediate gear drum rigidly mounted upon said sleeve, mechanism to hold the slow speed drum, the reversing drum, and the intermediate gear drum, gears upon a portion of said studs meshing with the internal gear of the slow speed drum and with the driving pinion, elongated pinions upon another portion of said studs meshing with the internal gear of the reversing drum and with the first mentioned gears, and additional elongated pinions carried by still another portion of said studs meshing with the intermediate pinion and with the first named gears.

3. In a transmission mechanism the combination of a driving shaft, a driving gear upon said shaft, a driven member, a sleeve upon the driving shaft provided with a pinion, a transmission member constructed of separable plates, one of said plates provided with a hub loosely mounted upon said sleeve, and the other of said plates provided with a hub forming a bearing for the inner end of the driving shaft, and rigidly connected upon the driven member, studs having their opposite extremities carried by said plates, a slow speed drum provided with an internal gear mounted upon the hub of the plate of the transmission member engaged upon the driven member, gears carried by a portion of said studs meshing with the driving pinion and with the internal gear of the slow speed drum, pinions carried within the transmission member upon other of said studs meshing with the pinion upon said sleeve and with said gears, a reversing drum loosely mounted upon the hub of the plate of the transmission member upon said sleeve provided with an internal gear, additional pinions carried upon still other of said studs meshing with said first named gears, and with the internal gear of the reversing drum, an intermediate gear drum mounted upon said sleeve, clutch mechanism to couple said intermediate gear drum to the driving shaft, and means to hold the slow speed drum, the reversing drum, and the intermediate gear drum.

4. In a transmission mechanism the combination of a driving shaft, a driving gear upon said shaft, a driven member, a sleeve upon the driving shaft provided with a pinion, a transmission member constructed of separable plates, one of said plates provided with a hub loosely mounted upon said sleeve, and the other of said plates provided with a hub forming a bearing for the inner end of the driving shaft and rigidly connected upon the driven member, a slow speed drum mounted upon the hub of the plate of the transmission member, upon the driven member provided with an internal gear, gears meshing with the driving pinion and with said internal gear, elongated pinions meshing with the pinion upon said sleeve and with said gears, studs for said gears carried in the plates of the transmission member, a reversing drum mounted upon the hub of the plate of the transmission member upon said sleeve provided with an internal gear, additional elongated pinions meshing with the internal gear upon the reversing drum and with the first named gears, an intermediate gear drum mounted upon said sleeve, clutch mechanism to couple said intermediate gear drum to the driving shaft, and means to hold the slow speed drum, the reversing drum, and the intermediate gear drum.

5. In a transmission mechanism the combination of a driving shaft, a driving pinion thereupon, a sleeve upon the shaft, an intermediate pinion upon said sleeve, a driven member, a transmission member constructed of separable plates, one of said plates provided with a hub loosely mounted upon said sleeve, and the other of said plates provided with a hub forming a bearing for the inner end of the driving shaft, and rigidly connected upon the driven member, studs having their opposite extremities carried by said plates, gears upon a portion of said studs meshing with the driving pinion, a slow speed drum provided with an internal gear meshing with said gears and loosely mounted upon the hub of the plate of the transmission member, additional pinions upon said studs meshing with said gears and with the intermediate pinion, brake mechanism to hold the slow speed drum, and a brake for the intermediate gear drum.

In testimony whereof, I have signed this specification in the presence of two subscribing witnesses.

RALPH E. NORTHWAY.

Witnesses:
N. S. WRIGHT,
A. M. MURPHY.